J. W. BRISCOE.
PLANT THINNING MACHINE.
APPLICATION FILED MAR. 26, 1909.
977,162.
Patented Nov. 29, 1910.
2 SHEETS—SHEET 1.
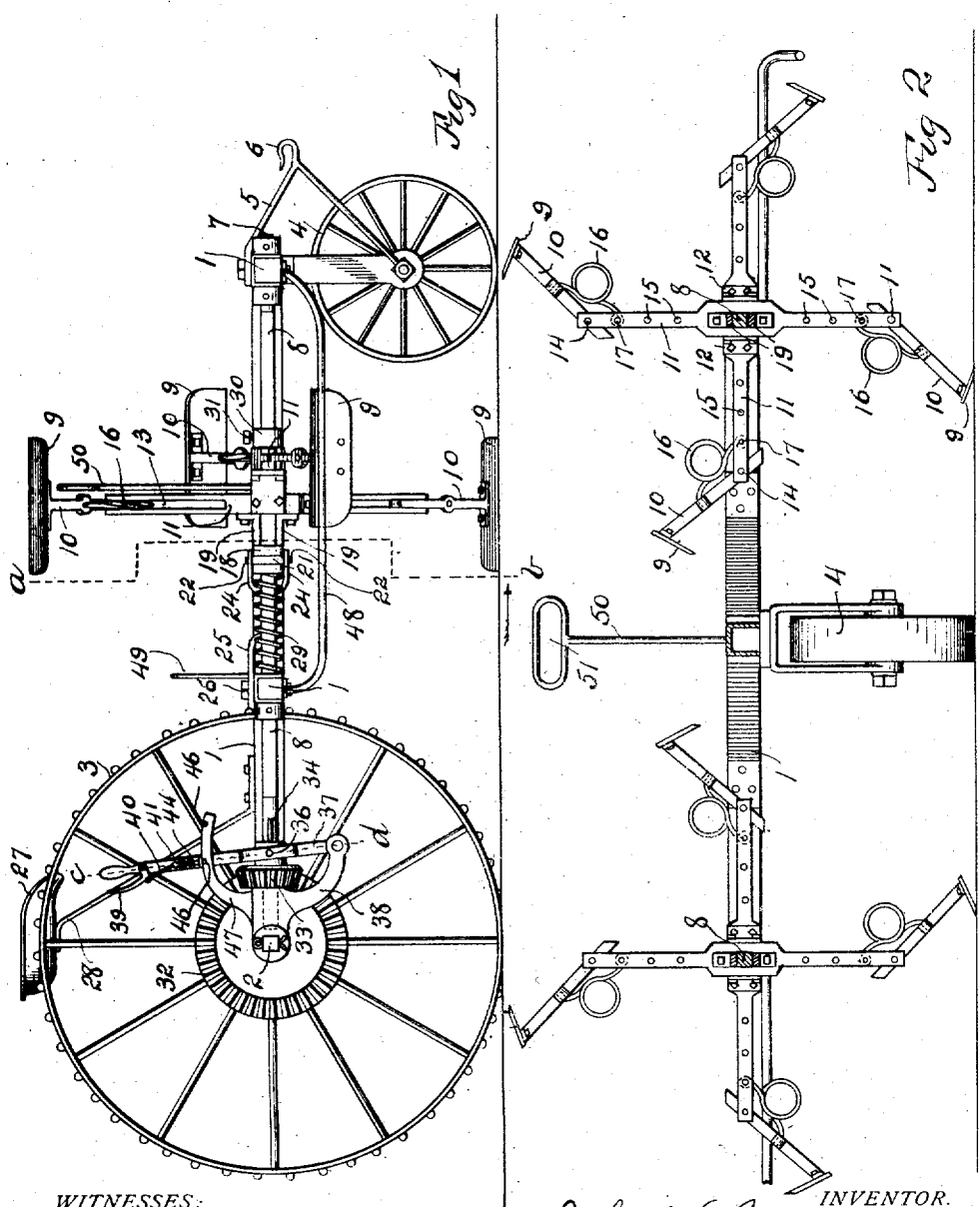
WITNESSES:
R L Hamilton
E. B. House
INVENTOR.
John W. Briscoe
BY
Warren D. House
His ATTORNEY.

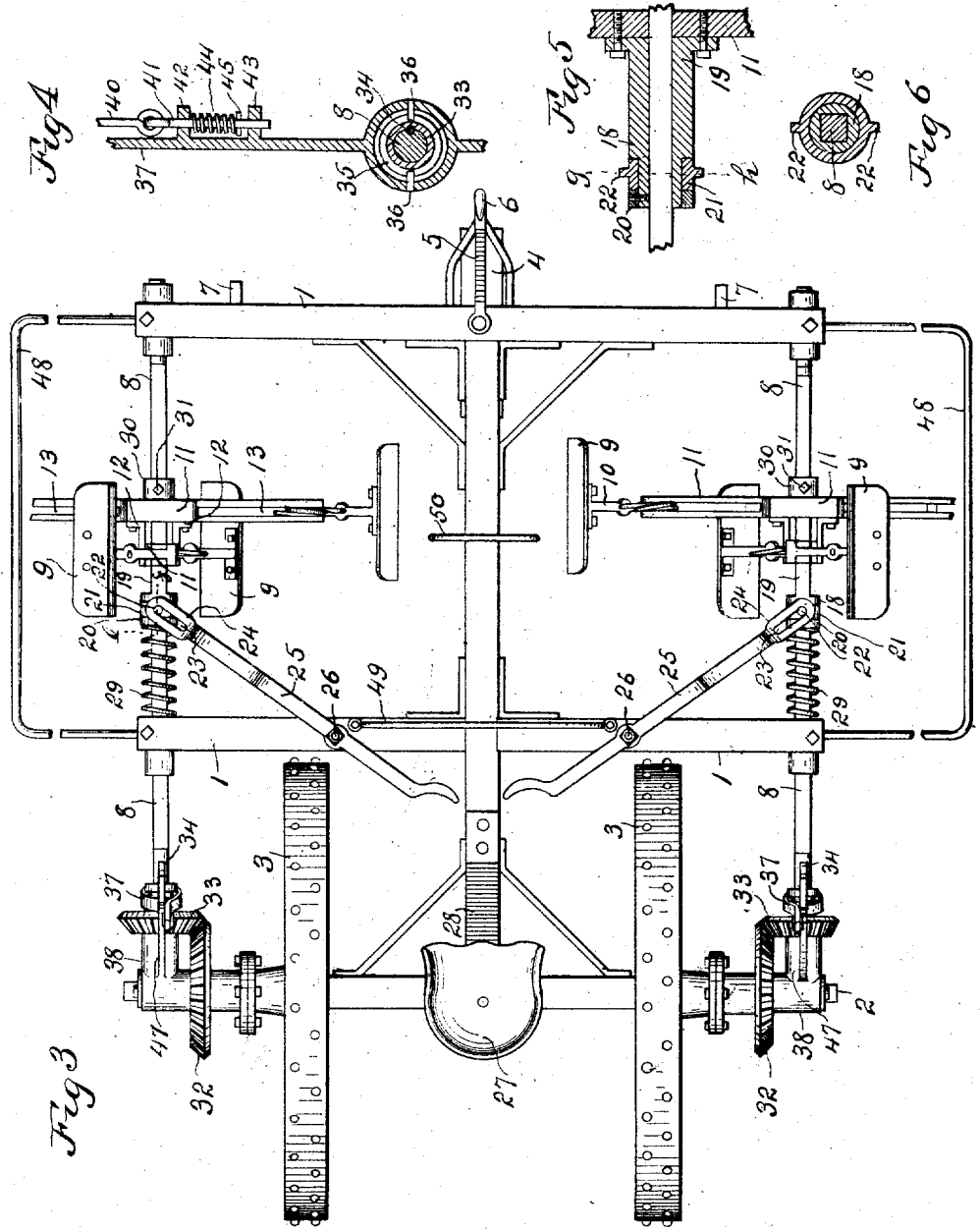

UNITED STATES PATENT OFFICE.

JOHN W. BRISCOE, OF CHATTANOOGA, OKLAHOMA.

PLANT-THINNING MACHINE.

977,162.    Specification of Letters Patent.    Patented Nov. 29, 1910.

Application filed March 26, 1909. Serial No. 486,003.

*To all whom it may concern:*

Be it known that I, JOHN W. BRISCOE, a citizen of the United States, residing at Chattanooga, in the county of Tillman and State of Oklahoma, have invented certain new and useful Improvements in Plant-Thinning Machines, of which the following is a specification.

My invention relates to improvements in plant thinning machines.

The object of my invention is to provide a machine adapted for cutting weeds and for thinning out plants which are disposed in rows.

My invention is particularly adapted for thinning the rows of cotton or beet plants.

In the preferred form of my invention, one or more rotary cutting devices are employed, which are arranged to rotate in planes disposed transversely to the line of draft of the machine.

One of the novel features of my invention consists in arranging the cutting devices so that they may be shifted parallel with the line of draft of the machine so that plants which it is desired to leave standing, shall be missed by the cutting devices.

Another novel feature of my invention comprises the radially adjustable cutting devices by means of which the cutting devices may operate equally as well on rows of plants located on ridges, in depressions, or at the level of the general surface of the ground.

Another novel feature of my invention consists in the yieldingly mounted cutting device, which arrangement prevents injury in case the cutting device strikes a rock or other unyielding substance. This arrangement also serves to prevent the cutting device entering the ground to any great depth.

Other novel features of my invention are hereinafter fully described and claimed.

In the accompanying drawings illustrative of my invention—Figure 1 is a side elevation of the machine. Fig. 2 is a vertical section taken on the dotted line *a—b* of Fig. 1. Fig. 3 is a plan view, partly broken away. Fig. 4 is an enlarged sectional view on the dotted line *c—d* of Fig. 1. Fig. 5 is an enlarged vertical sectional view on the dotted line *e—f* of Fig. 3. Fig. 6 is a cross section on the dotted line *g—h* of Fig. 5.

Similar characters of reference denote similar parts.

1 denotes a horizontal frame, which may be of any desired form or construction, and which is preferably provided with an axle 2 on which are rotatively mounted, two carrying wheels 3, which may also serve as driving wheels for imparting movement to the cutting device or devices. The forward end of the frame 1 is preferably supported upon a single central carrying wheel 4 upon which the frame 1 is pivotally mounted. For drawing the machine forward, any suitable draft appliance may be employed, such as a bracket 5, secured centrally to the forward end of the frame 1, and provided with a hook 6 to which a doubletree, not shown, may be attached. Two lugs 7, may also be provided at the forward end of the frame and at opposite sides of the center thereof, to which shafts or a tongue, not shown, may be attached.

In the preferable form of my invention, two parallel horizontal shafts 8, are rotatively mounted in the frame 1, at opposite sides respectively of the center of the frame, and disposed parallel with the line of draft of the machine. Upon the shaft 8 are mounted the cutting devices, which are preferably arranged to rotate in planes disposed transversely to the line of draft so as to pass transversely through the rows of plants which it is designed to thin when the machine is operated in the manner intended.

The cutting devices comprise preferably flat blades 9, having their cutting edges disposed parallel with the shafts 8, said blades being preferably secured at an acute angle to the outer ends respectively, of members 10, comprising bars the inner ends of which are pivotally supported upon suitable supporting means carried by and rotative with the shafts 8.

The supporting means just referred to comprises preferably four bars 11, secured two upon each shaft 8, the bars 11 on each shaft being disposed at right angles to each other, one bar being located forward of the other, to which it is secured by angle plates 12. Each bar 11 is provided with a central square hole in which is fitted the squared portion of the shaft 8 supporting said bar. Opposite ends of each bar 11 are provided with longitudinal slots 13, in which are radially adjustable the bars 10, which are pivotally supported each upon a transverse pin 14, adapted to be mounted in any one of a series of holes 15, disposed in the bar 11 at different distances from the shaft 8. A plurality of springs 16, are mounted two upon each bar 11 and are arranged to yieldingly retain the blades 9 and bars 10 in operative position. Preferably, each spring 16 is secured at one end to the adjacent bar 10, the other end being secured to a transverse pin 17, which may be mounted in one of the holes 15. The bars 10 and springs 16 may be radially adjustable relative to the axis of rotation of the bars 11 by changing the positions of the pins 14 and 17 to different holes 15, in the bars 11. The tension of each spring 16 is such that it will normally tend to swing the adjacent bar 10 into alinement with the bar 11, to which the bar 10 is pivoted. The disposition of the pins 14 and 17 relative to the inner end of the bar 10 is such that the pin 17 will be struck by and limit the movement relatively of the bar 10 to its supporting bar 11.

By reason of the bars 10 being yieldingly mounted on the bars 11 the resistance of the earth to the blades 9 will permit said blades to enter the ground only to a certain depth. Furthermore, in case the blades 9 strike a hard or unyielding substance the springs 16 will yield and thus damage will be prevented to the machine.

From the above it will be seen that when the shafts 8 are rotated and the frame 1 is drawn parallel with the rows of plants and with the shafts 8 disposed above said rows the four blades 9 carried by each shaft 8 will consecutively cut across the adjacent row of plants thereby cutting out some of the plants, the blades 9 being disposed radially in positions in which this result will be effected. The width of the blades 9 and the relative speed of rotation of the shafts 8 are such that as the frame 1 is drawn forward, certain of the plants in the rows which are being thinned will be left standing at distances suitable for the character of the plants which are being operated upon.

Oftentimes it is desirable to leave uncut some of the plants in a row, as for instance, in cases when some of the seed planted has failed to grow and the cutting of the standing plants by the ordinary operation of the machine would leave the standing plants too far apart. In such case the operation of the cutting blades should be stopped temporarily or the blades should be shifted either forward or rearward on the machine so as to miss the plant or plants which otherwise would be cut and which it is desired to leave standing. To effect this result I preferably provide means for shifting the blades 9, together with their supporting bars 10 and 11 in a direction parallel with the line of draft of the machine, which is parallel with the rows of plants which are being thinned.

I will now describe the preferred means for shifting the cutting blades:—Two sleeves 18, slidably fitted respectively on the squared portions of the shafts 8, are provided each with two arms 19, which are secured to the rear one of the adjacent bars 11, as shown in Figs. 1 and 2, and as shown also in Fig. 5. Secured to the rear end of each sleeve 18, is a collar 20. Rotatively mounted on a cylindrical portion of the sleeve 18, intermediate the collar 20 and the arms 19, is a collar 21, provided with diametrically opposite projections 22, which are located respectively in two longitudinal slots 23, provided respectively in two horizontal arms 24 of the bifurcated forward end of a lever 25, pivoted by means of a vertical bolt 26 to the frame 1. Two such levers 25 are provided, said levers being disposed respectively at opposite sides of the center of the machine, the rear ends of the levers being located in a position convenient to support the feet of the operator, who is supported upon a seat 27, located over the axle 2 intermediate the driving wheels 3 and mounted upon a bar 28, which inclines forwardly and downwardly and is secured at its lower end to the frame 1. Two springs 29 respectively encircle the shaft 8 and bear at their rear ends against the frame 1 and at their forward ends against the sleeves 18 respectively. The tension of the springs 29 is such that the sleeves 18 will force the bars 11 forwardly to a position in which the forward bars 11 will respectively strike collars 30, adjustable lengthwise on the shafts 8, to which they may be rigidly secured in their adjusted positions by set screws 31. When it is desired to rearwardly shift either set of cutting blades 9, the adjacent lever 25 is forced rearwardly at its forward end by the foot of the operator forcing forward the rear end of said lever. By releasing the lever 25 the adjacent spring 29 will restore the parts to their original position.

I will now describe the mechanism for transmitting rotation from the wheels 9 to the shaft 8:—Rigidly secured respectively to the hubs of the wheels 3 are two bevel gear wheels 32, adapted to mesh respectively with two bevel gear wheels 33, mounted respectively on the shafts 8, on which shafts said gear wheels 33 are longitudinally slidable for the purpose of being engaged and disengaged from the gear wheels 32. In each shaft 8 is provided a longitudinal groove in which is fitted a feather 34, mounted in a groove provided in the adjacent gear wheel 33. In the hub of each gear wheel 33 is provided an annular peripheral groove 35 in which are located two diametrically opposite pins 36, mounted in a lever 37, pivoted at its lower end to a bracket 38, which is rigidly secured upon the axle 2. Two such brackets are provided at opposite ends of the axle 2 respectively. Pivoted to the lever 37 adjacent to its upper end, is a bell crank lever 39, which is connected by means of a rod 40, as shown in Figs. 1 and 4, with the upper end of a locking bolt 41 which is slidably mounted in two lugs 42 and 43, provided on one side of the lever 37. Intermediate the lugs 42 and 43 is a coil spring 44, the upper end of which bears against the lug 42 and the lower end of which bears against a transverse pin 45, mounted in the bolt 41, as shown in Fig. 4. The lower end of the bolt 41 is adapted to alternately enter two notches 46, located in the upper edge, one in advance of the other, of an upwardly and forwardly extending arm 47, provided on the bracket 38. By properly swinging the bell crank lever 39 the bolt 41 can be released from the arm 47, thus permitting the lever 37 to be swung so as to engage or disengage the gear 33 from the gear 32.

To prevent any one from getting against the cutting blades 9 from the sides of the machine, two horizontal U-shaped guards or fenders 48, are secured to the opposite sides of the frame respectively in positions respectively embracing the two sets of cutting blades 9, as shown in Figs. 1 and 3. A similar vertical U-shaped guard 49, may be secured to the frame 1 intermediate the levers 25 to eliminate danger of the operator being injured by the blades. Supported upon the frame 1, intermediate the two sets of cutting blades, is a vertical bar 50, provided in its upper end with an eye 51, adapted to receive therethrough the reins, not shown, and support them out of contact with the revolving cutting blades 9.

In operating my invention, the machine is drawn forward with the wheels 3 between and with the shafts 8 above and parallel with the two rows of plants to be thinned. When the machine is in the proper position to begin cutting, the levers 37 are swung rearwardly at their upper ends to positions in which the bolts 41 will enter the rear recesses 46 in the arms 47, in which position the gears 33 will be engaged with the gears 32. The machine is then drawn forward and the rotation of the driving wheels 3 is transmitted to the shafts 8 in the manner already described. The shafts 8 in rotating, will revolve the cutting blades 9, as described, and the cutting blades in revolving will cut out certain portions of the two rows, leaving uncut plants at regular intervals. At any time the operator may, by swinging with his feet the levers 25 against the tension of the springs 29, shift the cutting blades relatively to the frame 1 so as to permit the blades to continue their rotation without cutting certain plants which it is desired to leave standing and which otherwise would be cut by the regular operation of the machine.

If desired, the brackets 38 may be provided with horizontal openings adapted to receive the cylindrical rear ends of the shafts 8 respectively.

I do not limit my invention to the particular structure illustrated in the drawings and hereinbefore described, as various modifications thereof may be made, within the scope of the appended claims, without departing from the spirit of my invention.

Having thus described my invention, what I claim and desire to secure by Letters Patent is:—

1. In a plant thinning machine, the combination with a rotary shaft disposed parallel with the line of draft, of driving means for rotating said shaft, a support rotative with said shaft and movable parallel with the line of draft, one or more cutting devices carried by said support, means for moving said support parallel with said shaft and a stop adjustable lengthwise on and having means for being rigidly secured to the shaft, for limiting the parallel movement of said support.

2. In a plant thinning machine, the combination with a rotary shaft, parallel with the line of draft, of means for rotating said shaft, one or more cutting devices carried by and rotative with said shaft, manually operated means for shifting said cutting devices in one direction parallel with said shaft, means for shifting said devices in the opposite direction and a stop adjustable lengthwise on and having means for being rigidly secured to the shaft, for limiting the parallel movement of said devices.

3. In a plant thinning machine, the combination with driving means, of a shaft rotative thereby and disposed parallel with the line of draft, a support movable lengthwise on and rotative with said shaft, one or more cutting devices carried by said support, a lever for shifting said support lengthwise in one direction, means for shifting said support in the opposite direction and a stop adjustable lengthwise on and having means for being rigidly secured to the shaft, for limiting the parallel movement of said support.

4. In a plant thinning machine, the combination with a rotary shaft disposed parallel with the line of draft, a support movable lengthwise on and rotatable with the shaft, one or more cutting devices carried by said support, a stop adjustable lengthwise on and having means for being secured rigidly to said shaft, a spring for normally forcing the support against said stop, and manually operated means for forcing the support in the opposite direction.

In testimony whereof I have signed my name to this specification in presence of two subscribing witnesses.

JOHN W. BRISCOE.

Witnesses:
 E. B. House,
 Ichabod K. Parshall.